(No Model.)

G. TAYLOR.
TEA KETTLE.

No. 301,403. Patented July 1, 1884.

Witnesses:
A. C. Eader
Jno. E. Morris

Inventor:
George Taylor
By Chas B. Mann
Attorney.

UNITED STATES PATENT OFFICE.

GEORGE TAYLOR, OF BALTIMORE, MARYLAND.

TEA-KETTLE.

SPECIFICATION forming part of Letters Patent No. 301,403, dated July 1, 1884.

Application filed December 26, 1883. (No model.)

*To all whom it may concern:*

Be it known that I, GEORGE TAYLOR, a citizen of the United States, residing at Baltimore, State of Maryland, have invented certain new and useful Improvements in Tea-Kettles, of which the following is a specification.

My invention relates to a certain improvement in tea-kettles, which first will be described and then claimed.

Figure 1:
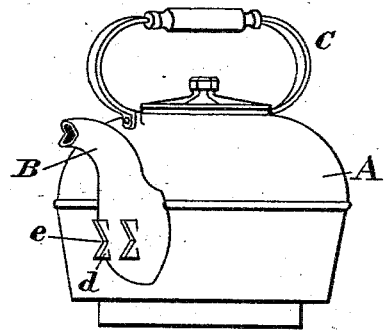
Figure 2:
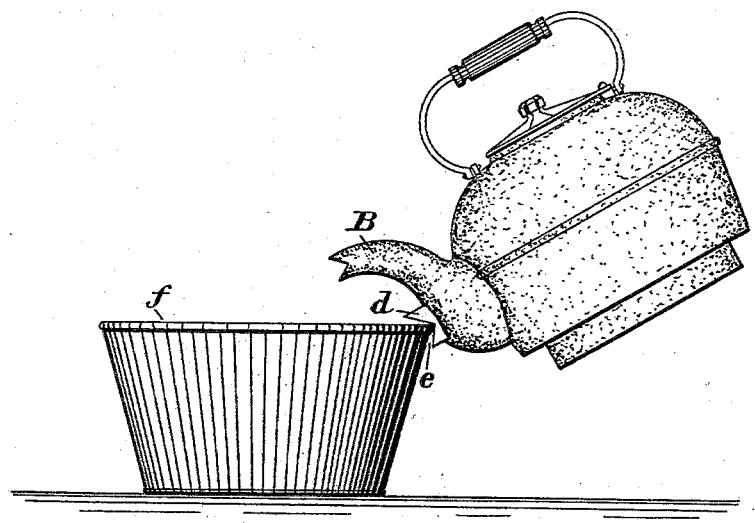

In the accompanying drawings, which illustrate the invention, Figure 1 is a front view of a kettle provided with the improved notched lugs. Fig. 2 is another view illustrating how the lugs rest on the edge of a vessel when tilting the kettle.

The kettle A, spout B, and bail or handle C may be of any ordinary or desired shape. I attach to the body of the kettle at the front or spout side, or to the spout itself, one or more lugs, d, each having a notch, e. These notched lugs are cast integral with the kettle. The notch is preferably an angular notch; but it may be of other shape. By preference two such lugs are used. When thus constructed, the kettle may be held by the bail and water may be poured from the spout into another vessel, f, by resting the notched lugs on the edge of the vessel, as shown in the drawings, and thereby all liability of the kettle slipping back or forward is avoided, as well as the liability of its rolling or turning sidewise, which, with ordinary kettles rounded in front is a matter of frequent occurrence. My notched lugs, therefore, serve a double purpose, and are applicable to kettles of any shape, and do not appreciably increase the cost of the kettle.

Having described my invention, I claim and desire to secure by Letters Patent of the United States—

A tea-kettle provided at the front or spout side with one or more notched lugs, as and for the purpose set forth.

In testimony whereof I affix my signature in presence of two witnesses.

GEORGE TAYLOR.

Witnesses:
JNO. T. MADDOX,
JNO. E. MORRIS.